(12) United States Patent
Wan et al.

(10) Patent No.: US 12,124,120 B2
(45) Date of Patent: Oct. 22, 2024

(54) LIQUID DISPLAY DEVICE AND PEEP-PROOF CONTROL METHOD THEREOF

(71) Applicant: HKC CORPORATION LIMITED, Shenzhen (CN)

(72) Inventors: Ye Wan, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/641,005

(22) Filed: Apr. 19, 2024

(65) Prior Publication Data
US 2024/0272465 A1    Aug. 15, 2024

Related U.S. Application Data

(63) Continuation of application No. PCT/CN2022/142111, filed on Dec. 26, 2022.

(30) Foreign Application Priority Data

Aug. 17, 2022 (CN) .......................... 202210984826.0

(51) Int. Cl.
  *G02F 1/13* (2006.01)
  *G02F 1/1335* (2006.01)
  (Continued)

(52) U.S. Cl.
  CPC ...... *G02F 1/1323* (2013.01); *G02F 1/133606* (2013.01); *G02F 1/137* (2013.01); *G02F 1/133601* (2021.01)

(58) Field of Classification Search
  CPC .......................... G02F 1/1323; G02F 1/133601
  See application file for complete search history.

(56) References Cited

U.S. PATENT DOCUMENTS

2009/0207613 A1*  8/2009  Furukawa ............ G09G 3/3426
                                                 362/257
2019/0227381 A1   7/2019  Day et al.
(Continued)

FOREIGN PATENT DOCUMENTS

CN  103544921 A   1/2014
CN  204790254 U  11/2015
(Continued)

OTHER PUBLICATIONS

First Office Action issued in counterpart Chinese Patent Application No. 202210984826.0, dated Sep. 26, 2022.
(Continued)

*Primary Examiner* — Alexander P Gross
(74) *Attorney, Agent, or Firm* — Westbridge IP LLC

(57) ABSTRACT

Disclosed are a liquid display device and a peep-proof control method thereof. The method includes: receiving and detecting a screen display signal required by the liquid crystal display device, and the screen display signal includes a brightness signal and a peep-proof signal; and in response to detecting that the peep-proof signal in the screen display signal is a partial peep-proof information, controlling a first switching timing of a backlight working state of a lamp panel in the liquid crystal display device to adapt to a second switching timing of a film working state of an electronically controlled liquid crystal film according to the brightness signal, so as to realize a partial peep-proof display of the liquid crystal display device.

13 Claims, 6 Drawing Sheets

(51) Int. Cl.
    *G02F 1/13357*    (2006.01)
    *G02F 1/137*      (2006.01)

(56) References Cited

U.S. PATENT DOCUMENTS

2020/0319512 A1   10/2020   Murzyn et al.
2022/0050314 A1*  2/2022   Hsieh .................... G09G 3/342

FOREIGN PATENT DOCUMENTS

| | | |
|---|---|---|
| CN | 109597232 A | 4/2019 |
| CN | 110750009 A | 2/2020 |
| CN | 214540305 U | 10/2021 |
| CN | 114049866 A | 2/2022 |
| CN | 114255713 A | 3/2022 |
| CN | 115061299 A | 9/2022 |
| CN | 115327819 A | 11/2022 |

OTHER PUBLICATIONS

International Search Report issued in corresponding PCT Application No. PCT/CN2022/142111, dated May 6, 2023.
Notification to Grant Patent Right for Invention issued in counterpart Chinese Patent Application No. 202210984826.0, dated Mar. 1, 2023.
Second Office Action issued in counterpart Chinese Patent Application No. 202210984826.0, dated Oct. 24, 2022.
Written Opinion issued in corresponding PCT Application No. PCT/CN2022/142111, dated May 6, 2023.

\* cited by examiner

LIQUID DISPLAY DEVICE AND PEEP-PROOF CONTROL METHOD THEREOF

CROSS-REFERENCE TO RELATED APPLICATIONS

This application is a continuation application of International Application No. PCT/CN2022/142111, filed on Dec. 26, 2022, which claims priority to Chinese Patent Application No. 202210984826.0, filed on Aug. 17, 2022. The above-mentioned applications are incorporated herein by reference in their entireties.

TECHNICAL FIELD

The present application relates to the technical field of liquid crystal display, and in particular to a liquid display device and a peep-proof control method thereof.

BACKGROUND

In the existing peep-proof technology of the liquid crystal display, the entire display panel of the liquid crystal display is processed, that is, the entire display panel is controlled to be switched to a full peep-proof state or a non peep-proof state. Although the user's requirements for state switching are met, the switching of the entire display panel to the full or the non peep-proof state makes it less flexible for the user, and the display panel in the full peep-proof state has a high power consumption, which cannot meet the user's needs in a targeted manner.

SUMMARY

The main purpose of the present application is to provide a liquid display device and a peep-proof control method thereof, aiming to solve the problem of low flexibility and high power consumption resulting from switching the entire display panel to a full peep-proof state or a non peep-proof state, and to meet the user's needs in a targeted manner.

In order to achieve the above purpose, the present application provides a peep-proof control method for the liquid crystal display device, including:
   receiving and detecting a screen display signal required by the liquid crystal display device, and the screen display signal includes a brightness signal and a peep-proof signal; and
   in response to detecting that the peep-proof signal in the screen display signal is a partial peep-proof information, controlling a first switching timing of a backlight working state of a lamp panel in the liquid crystal display device to adapt to a second switching timing of a film working state of an electronically controlled liquid crystal film according to the brightness signal, so as to realize a partial peep-proof display of the liquid crystal display device.

The present application also provides a liquid crystal display device, including:
   a digital system unit configured to receive and detect a screen display signal required by the liquid crystal display device, and the screen display signal includes a brightness signal and a peep-proof signal; and
   a logic control unit configured to, in response to detecting that the peep-proof signal in the screen display signal is a partial peep-proof information, control a first switching timing of a backlight working state of a lamp panel in the liquid crystal display device to adapt to a second switching timing of a film working state of an electronically controlled liquid crystal film according to the partial peep-proof information and the brightness signal, to realize a partial peep-proof display of the liquid crystal display device.

In the present application, the digital system unit receives and detects the screen display signal required by the liquid crystal display device to display. When the user's need of the partially peep-proof is detected, the first switching timing based on the backlight working state of different target backlight districts in the lamp panel is adapted to the second switching timing in the film working state of the electronically controlled liquid crystal film, so that the collimated light emitted by the backlight district at the first switching timing passes through the peep-proof film and the electronically controlled liquid crystal film at the second switching timing, and the light remains collimated. For example, when the film working state of the electronically controlled liquid crystal film is in the second switching timing at the transparent state, the backlight working state of the target backlight district is switched to the first switching timing in the lighted state. In this way, the light emitted by the lamp bead of the target backlight district is kept in a collimated state after passing through the peep-proof film and the electronically controlled liquid crystal film in the transparent state. state, so that the user directly facing the display panel can see the light source, that is, only the user in the center can see the information content on the display panel, which realizes the effect of partial peep-proof display and provides users with personalized requirements for partial peep-proof, enhances the flexibility of the peep-proof technology, and avoids the high power consumption in the full peep-proof state.

The achievement of the purpose of the present application, functional characteristics and advantages will be further described with reference to the accompanying drawings in conjunction with embodiments.

DETAILED DESCRIPTION OF THE EMBODIMENTS

It should be understood that the embodiments described herein are only intended to interpret and are not intended to limit this application.

According to an embodiment of the present application, the main solution is: receiving and detecting a screen display signal required by a liquid crystal display device 201. When a partial peep-proof information is detected, a first switching timing in a backlight state of a backlight district is controlled to adapt to a second switching timing in a film working state of an electronically controlled liquid crystal film, so as to realize a partial peep-proof display of the liquid crystal display device 201.

In the existing peep-proof technology of the liquid crystal display, an entire display panel of the liquid crystal display is processed, that is, the entire display panel is controlled to be switched to a full peep-proof state or a non peep-proof state, which makes it less flexible for the user. The display panel in the full peep-proof state has a high power consumption, which cannot meet the user's needs in a targeted manner.

In the present application, a digital system unit 202 receives and detects the screen display signal required by the liquid crystal display device 201 to display. The first switching timing based on the backlight working state of different target backlight districts in a lamp panel is adapted to the second switching timing in the film working state of an electronically controlled liquid crystal film. When a peep-proof signal received in the screen display signal is a partial peep-proof information, the backlight working state of different backlight districts in the lamp panel is controlled to adapt to the film working state of the electronically controlled liquid crystal film according to the partial peep-proof information, so that a collimated light emitted by the backlight district in the first switching timing passes through the peep-proof film and the electronically controlled liquid crystal film in the second switching timing, and the light remains collimated, which realizes the partial peep-proof of the display panel, enhances the flexibility at the user's disposal, meets the user's needs of the partial peep-proof in a targeted manner, and avoids the high power consumption in the full peep-proof state.

Figure 1:
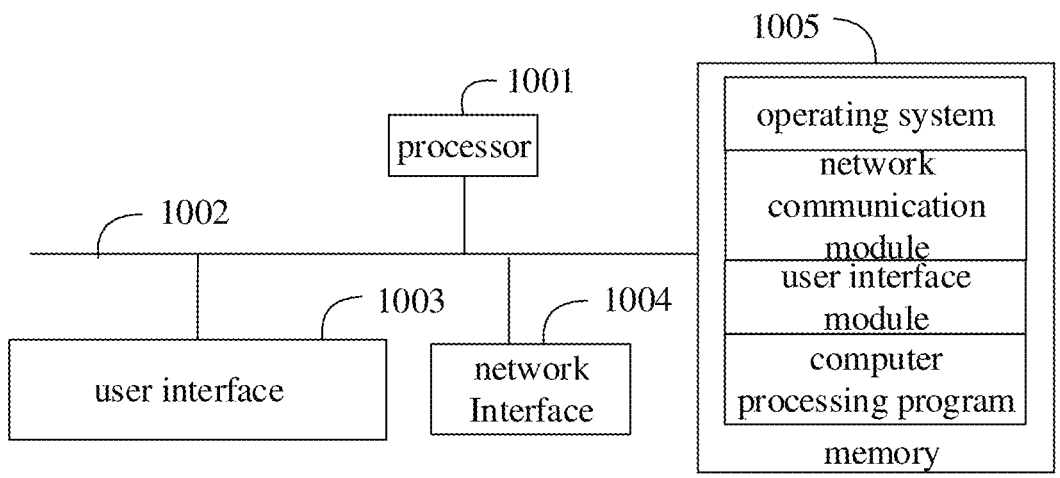
FIG. 1 is a schematic structural view of a terminal in a hardware operating environment according to an embodiment of the present application.

As shown in FIG. 1, FIG. 1 is a schematic structural view of a terminal in a hardware operating environment according to an embodiment of the present application.

The peep-proof control method for the liquid crystal display device 201 according to embodiments of the present application is applied to the liquid crystal display device 201. As shown in FIG. 1, the liquid crystal display device 201 may include: a processor 1001 such as a central processing unit (CPU), a network interface 1004, a user interface 1003, a memory 1005, and a communication bus 1002. A communication bus 1002 is used to realize a connection and a communication between these components. The user interface 1003 may include a display and an input unit such as a keyboard, and the user interface 1003 may also include a standard wired interface and a wireless interface. In an embodiment, the network interface 1004 may include a standard wired interface and a wireless interface (such as a WI-FI interface). The memory 1005 may be a high-speed RAM memory, or a stable memory (non-volatile memory), such as a disk memory. In an embodiment, the memory 1005 may also be a storage device independent of the processor 1001.

In an embodiment, the liquid crystal display device 201 may further include a camera, a radio frequency (RF) circuit, a sensor, an audio circuit, and a WiFi module, etc. The sensor can be a light sensor, a motion sensor, and other sensors. Specifically, the light sensor may include an ambient light sensor and a proximity sensor. The ambient light sensor may adjust a brightness of the display screen according to a brightness of the ambient light, and the proximity sensor may turn off the display screen and/or the backlight when the mobile terminal moves to an ear. As a kind of motion sensors, a gravitational acceleration sensor can detect magnitudes of acceleration in various directions, which are generally three axes, and can detect the magnitude and the direction of gravity when it is stationary, which can be used to identify the application of mobile terminal posture, such as horizontal and vertical screen switching, related games, magnetometer posture calibration, and can be used to vibration recognition related functions, such as a pedometer, and a tap, etc. The mobile terminal can also be equipped with other sensors such as a gyroscope, a barometer, a hygrometer, a thermometer, and an infrared sensor, etc, which is not limited here.

Those skilled in the art can understand that the structure of the liquid crystal display device 201 shown in FIG. 1 does not constitute a limitation on the liquid crystal display device 201, and may include more or fewer components, a combination of some components, or differently arranged components than shown in the figure.

As shown in FIG. 1, the memory 1005, as a computer storage medium, may include an operating system, a network communication module, a user interface module, and a computer processing program.

In the terminal shown in FIG. 1, the network interface 1004 is mainly used to connect to a background server and perform a data communication with the background server, and the user interface 1003 is mainly used to connect to a client terminal and perform the data communication with the client terminal. The processor 1001 can be used to call the computer processing program stored in memory 1005, and perform the following operations:

receiving and detecting the screen display signal required by the liquid crystal display device 201, and the screen display signal includes a brightness signal and a peep-proof signal;

in response to that the peep-proof signal in the screen display signal is the partial peep-proof information, controlling the first switching timing in the backlight working state of the lamp panel in the liquid crystal display device 201 to adapt to the second switching timing in the film working state of the electronically controlled liquid crystal film, so as to realize the partial peep-proof display of the liquid crystal display device 201.

In an embodiment, the processor 1001 can call the computer processing program stored in the memory 1005, and perform the following operations:

before controlling the first switching timing in the backlight working state of the lamp panel in the liquid crystal display device 201 to adapt to the second switching timing in the film working state of the electronically controlled liquid crystal film, the method includes:

dividing the lamp panel into the target backlight district and other backlight districts according to the peep-proof screen position signal in the partial peep-proof information, and controlling the film working state of the electronically controlled liquid crystal film according to the film working signal in the partial peep-proof information.

In an embodiment, the processor 1001 can call the computer processing program stored in the memory 1005, and perform the following operations:

in response to that the film working state of the electronically controlled liquid crystal film is the second switching timing in the transparent state, controlling the backlight working state of the target backlight district to the first switching timing in the lighted state and controlling the backlight working states of the other backlight districts to the first switching timing in an extinguished state according to the brightness signal.

In an embodiment, the processor 1001 can call the computer processing program stored in the memory 1005, and perform the following operations:

in response to that the film working state of the electronically controlled liquid crystal film is the second switching timing in an opaque state, controlling the backlight working state of the target backlight district to the first switching timing in the extinguished state and controlling the backlight working states of the other backlight districts to the first switching timing in the lighted state according to the brightness signal.

In an embodiment, the processor 1001 can call the computer processing program stored in the memory 1005, and perform the following operations:

after receiving and detecting the screen display signal required by the liquid crystal display device 201, in response to that the peep-proof signal in the screen display signal is detected to be a full peep-proof information, controlling the second switching timing in the film working state of the electronically controlled liquid crystal to be in a transparent state according to the full peep-proof information, and controlling the backlight working state of the lamp panel to the first switching timing in the lighted state according to the brightness signal.

In an embodiment, the processor 1001 can call the computer processing program stored in the memory 1005, and perform the following operations:

after receiving and detecting the screen display signal required by the liquid crystal display device 201, in response to that the peep-proof signal in the screen display signal is a non peep-proof information, controlling the second switching timing of the film working state of the electronically controlled liquid crystal film to be in the opaque state according to the non peep-proof information, and controlling the backlight working state of the lamp panel to be in the first switching timing in the lighted state according to the brightness signal.

In an embodiment, the processor 1001 can call the computer processing program stored in the memory 1005, and perform the following operations:

the screen display signal including an adaptation signal;

driving liquid crystal molecules in the display panel of the liquid crystal display device 201 according to the adaptation signal, and playing a corresponding picture on the display panel according to the brightness signal and the peep-proof signal.

Figure 2:
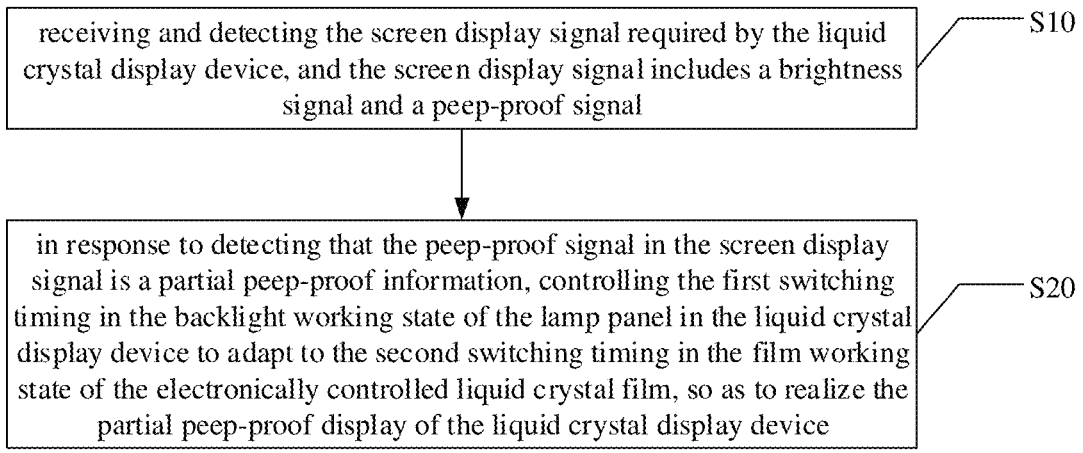
FIG. 2 is a schematic flowchart of a peep-proof control method for a liquid crystal display device according to an embodiment of the present application.

Referring to FIG. 2, the peep-proof control method for the liquid crystal display device 201 according to an embodiment of the present application includes:

S10, receiving and detecting the screen display signal required by the liquid crystal display device 201, and the screen display signal includes a brightness signal and a peep-proof signal;

In this embodiment, before the display panel displays the display screen, the digital system unit 202 inside the liquid crystal display device 201 will receive the screen display signal required to process the display screen, and the screen display signal required in this embodiment includes the brightness signal, the peep-proof signal, and the adaptation signal. The signals may specifically be other signals, which are not limited in this embodiment.

When receiving the screen display signal, the digital system unit 202 will distribute according to different signal types in the screen display signal. This embodiment takes the peep-proof signal as the main body. After receiving the peep-proof signal, the digital system unit 202 detects the information included in the peep-proof signal, and performs different logic controls on a Mini light-emitting diode (LED) lamp panel based on the different information contained in the peep-proof signal combined with the brightness signal. The Mini LED lamp panel mentioned in this embodiment is equivalent to the lamp panel in FIG. 5.

S20, in response to detecting that the peep-proof signal in the screen display signal is a partial peep-proof information, controlling the first switching timing in the backlight working state of the lamp panel in the liquid crystal display device 201 to adapt to the second switching timing in the film working state of the electronically controlled liquid crystal film, so as to realize the partial peep-proof display of the liquid crystal display device 201.

For example, when the peep-proof signal is detected by the digital system unit 202 and the partial peep-proof information is obtained, it means that the user has a demand for the partial peep-proof on the display panel at this time. Based on the partial peep-proof information, the digital system unit 202 controls the film working state of the electronically controlled liquid crystal film to switch back and forth between the transparent state and the opaque state, that is, control the electronically controlled liquid crystal film to switch between the transparent state and the opaque state at a frequency greater than or equal to 20 Hz.

When the electronically controlled liquid crystal film is in the transparent state, the Mini LED lamp panel is controlled to light up, and when the electronically controlled liquid crystal film is in the opaque state, the Mini LED lamp panel is controlled to be turned off. In this way, it can avoid the scattering of incident light in the liquid crystal display device 201, ensure that the light is projected on the display panel in a collimated state to display the corresponding screen, and make the display panel enter the peep-proof state, so as to cooperate with the characteristics of the Mini LED lamp panel having multiple backlight districts set at intervals. The film working state of the electronically controlled liquid crystal film is controlled to switch back and forth between the transparent state and the opaque state, the peep-proof operation can be performed in the backlight district marked with the position signal of the peep-proof screen, that is, the target backlight district, and the non-peep-proof operation can be performed in the backlight district without the position signal of the peep-proof screen, that is, other backlight districts. In this way, the first switching timing of the backlight working state of the target backlight district is matched with the second switching timing of the film working state of the electronically controlled liquid crystal film, thereby realizing the partial peep-proof effect on the same display panel.

In an embodiment, before controlling the first switching timing in the backlight working state of the lamp panel in the liquid crystal display device 201 to adapt to the second switching timing in the film working state of the electronically controlled liquid crystal film in S20, the method further includes:

S21: dividing the lamp panel into the target backlight district and other backlight districts according to the peep-proof screen position signal in the partial peep-proof information, and controlling the film working state of the electronically controlled liquid crystal film according to the film working signal in the partial peep-proof information.

Specifically, according to the position signal of the peep-proof screen in the partial peep-proof information, the Mini LED lamp panel is divided into the target backlight district and other backlight districts. For example, the left half of the display panel is controlled to be the peep-proof area by the user through operating the device, and the right half is not controlled. At this time, the peep-proof screen position signal generated by this operation divides the backlight district corresponding to the left half of the display panel into the target backlight district, and divides the backlight district corresponding to the right half of the display panel into other backlight districts. At the same time, according to the working signal of the film in the partial peep-proof information, the logic control unit 203 in the liquid crystal display device 201 controls the electronically controlled liquid crystal film to switch back and forth between the transparent state and the opaque state.

Figure 3:
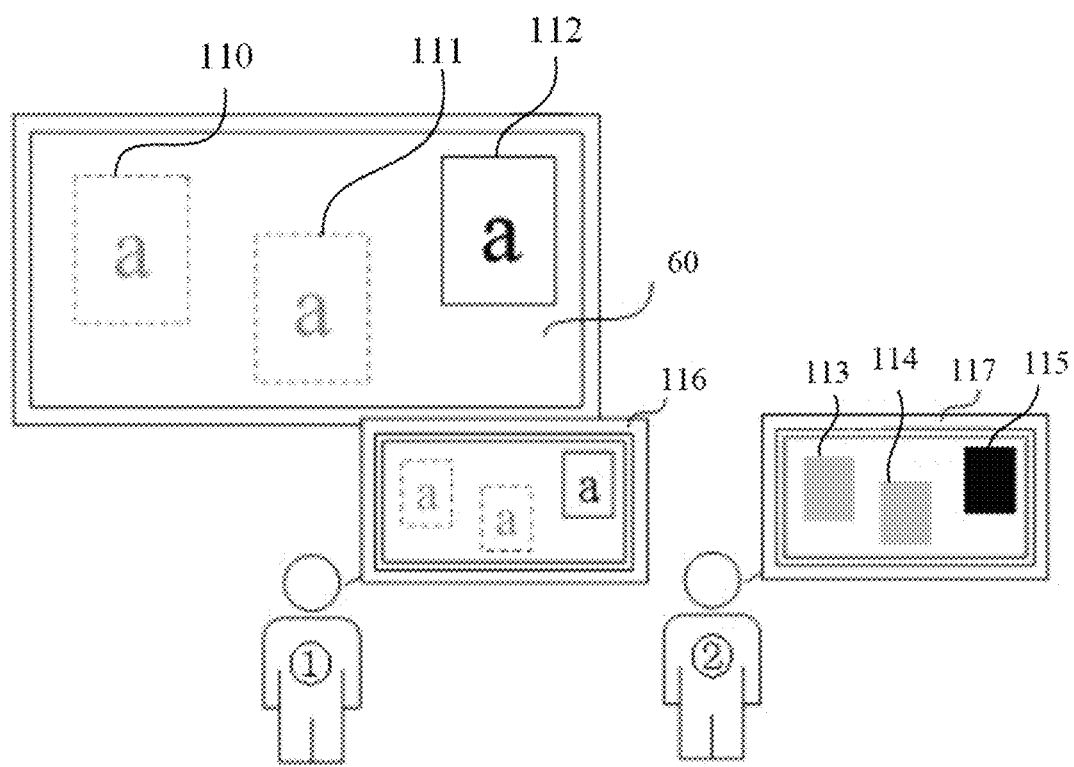
FIG. 3 is a schematic view of scenes from users at different positions when a target backlight district dynamically changes.

It should be noted that, as shown in FIG. 3, the target backlight district can be changed dynamically. For example, an area a shown in the display panel is controlled to the peep-proof area by the user through operating the device, and a position of the area a is moved from left to right. Referring to FIGS. 3, 110 and 111 represent the position of the area a before moving, and 112 represents the current position of the area a, so that the dynamic moving position of the area a in the display panel in FIG. 3 is from 110 to 111 to 112. The position information of the peep-proof screen is updated based on the moving track of the position of the area a, and the target backlight district corresponding to the position information of the peep-proof screen is updated, so that the area on the display panel that needs to be peep-proof can be dynamically changed based on the change of the display position of the information content. Through a visual frame, i.e. 116, of the user ①, i.e. the user in the center, no matter where the area a is located on the display panel, the user ① can clearly see the area a on the display panel. On the contrast, through a visual frame, i.e. 117, of the user ②, i.e., the user not in the center, it can be seen that due to the partial peep-proof effect, the user ② can only see other information content other than the area a. As for the area a, the user ② can only see a black shadow, 113 and 114 represent the position of the area a in user ② 's eyes before moving, and 115 represents the current position of the area a in user ② 's eyes, so the dynamic moving position of the area a in user ② 's eyes is 113 to 114 to 115, which further enhances the controllable flexibility and convenience of the peep-proof technology, and avoids the situation where the user needs to re-operate and set when the area to be peep-proof is changed.

In an embodiment, the step of controlling the first switching timing in the backlight working state of the lamp panel in the liquid crystal display device 201 to adapt to the second switching timing in the film working state of the electronically controlled liquid crystal film in S20 includes:

S22, in response to that the film working state of the electronically controlled liquid crystal film is the second switching timing in the transparent state, controlling the backlight working state of the target backlight district to be in the lighted state and controlling the backlight working state of the other backlight districts to be in the extinguished state according to the brightness signal.

S23, when the film working state of the electronically controlled liquid crystal film is the second switching timing in the opaque state, controlling the backlight working state of the target backlight district to the first switching in the extinguished state and controlling the backlight working state of the other backlight districts to be in the lighted state according to the brightness signal.

When the film working state of the electronically controlled liquid crystal film is switched to the transparent state at this time, the logic control unit 203 switches the backlight working state of the target backlight district to the lighted state and switches the backlight working state of other backlight districts to the extinguished state or the lighted state according to the brightness signal at this time. In order to achieve a high-contrast picture effect, the backlight working state of other backlight districts is not affected by the film working state of the electronically controlled liquid crystal film and the information of whether it is peep-proof or not. When the film working state of the electronically controlled liquid crystal film is switched to the opaque state, the logic control unit 203 switches the backlight working state of the target backlight district to the extinguished state and switches the backlight working states of other backlight districts to the lighted state according to the brightness signal at this time, so that the user in the center can see the content on the entire display panel, while the user not in the center can only see the content on the display panel corresponding to other backlight districts, so as to realize the partial peep-proof effect of the display panel.

It should be noted that the brightness adjustment of the target backlight district and other backlight districts according to the brightness signal can be through a direct current (DC) or a pulse width modulation (PWM). As for the PWM brightness adjustment, the adjustment frequency of the target backlight district and the lamp beads in other backlight districts is an integer multiple of the frequency of the electronically controlled liquid crystal film. For example, when the frequency of the electronically controlled liquid crystal film is 20 Hz, the frequency of the target backlight district and the other backlight districts can be 40 Hz, 60 Hz, 80 Hz, etc., and can be analogized in integer multiples.

In an embodiment, the screen display signal in S10 further includes an adaptation signal;

S11, driving the liquid crystal molecules in the display panel of the liquid crystal display device 201 through the adaptation signal, and displaying a corresponding picture on the display panel according to the brightness signal and the peep-proof signal.

In an embodiment, the display panel is a liquid crystal display (LCD) panel, and the adaptation signal is the LCD adaptation signal.

The LCD adaptation signal is used to drive the liquid crystal molecules in the LCD display panel. After combining the above-mentioned scenes, that is, when the peep-proof signal contains the partial peep-proof information, control the first switching timing in the backlight working state of the backlight district in the liquid crystal display device 201 to adapt to the second switching timing in the film working state of the electronically controlled liquid crystal film according to the partial peep-proof information and the brightness signal, the screen displayed by the LCD display panel at this time is: the user ① in the center can see the information content presented on the entire LCD display panel; and the user ② not in the center can only see the information content in a certain areas on the entire LCD display panel, that is, the information content on the LCD display panel corresponding to the other backlight districts, so that the LCD display panel can display high-contrast images in the partial dynamic peep-proof mode under the backlight district control of the Mini LED lamp panel.

In this embodiment, the digital system unit 202 is used to receive and detect the screen display signal required by the liquid crystal display device 201 to display the screen, and perform a distribution processing according to different signal types in the screen display signal, so that the logic control unit 203 can perform different logic controls based on the distribution processing. For example, when the partial peep-proof information is detected, the film working state of the electronically controlled liquid crystal film is controlled to switch back and forth between the transparent state and the opaque state according to the characteristics of the lamp panel with multiple backlight districts set at intervals, so that the peep-proof operation can be performed on the target backlight district corresponding to the position signal of the peep-proof screen, that is, when the electronically controlled liquid crystal film is switched to the transparent state, the backlight working state of the target backlight district is switched to the lighted state, and when the electronically controlled liquid crystal film is switched to the opaque state, the backlight working state of the target backlight district is switched to the extinguished state. The backlight working state of each backlight district is compatible with the film working state of the electronically controlled liquid crystal film, so as to realize the partial peep-proof effect on the same display panel, which provides users with personalized requirements for the partial peep-proof, enhances the flexibility of the peep-proof technology, and avoids the high power consumption in the full peep-proof state.

Figure 4:
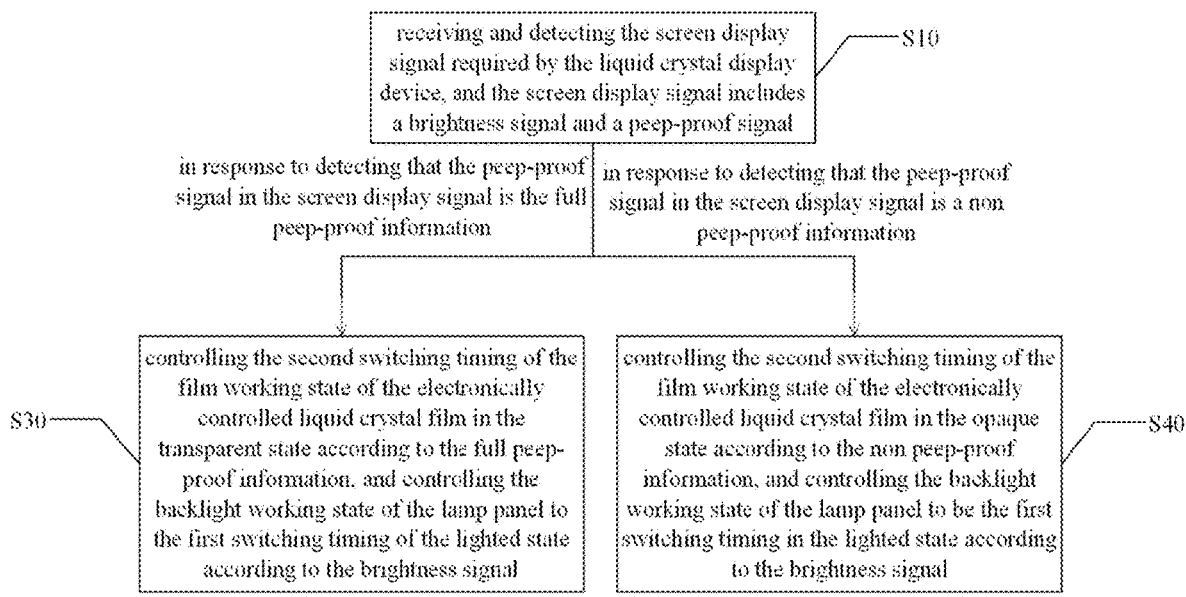
FIG. 4 is a schematic flowchart of a subsequent step after S10 in the peep-proof control method for the liquid crystal display device of the present application.

In an embodiment, referring to FIG. 4, the present application provides a peep-proof control method for a liquid crystal display device 201. After the step of receiving and detecting the screen display signal required by the liquid crystal display device 201 in S10, it further includes:

S30, in response to detecting that the peep-proof signal in the screen display signal is the full peep-proof information, controlling the second switching timing of the film working state of the electronically controlled liquid crystal film in the transparent state according to the full peep-proof information, and controlling the backlight working state of the lamp panel to the first switching timing of the lighted state according to the brightness signal.

When the peep-proof signal is detected by the digital system unit 202 and the information obtained is the full peep-proof information, it means that the user at this time has a need for peep-proof on the entire display panel. Therefore, based on the full peep-proof information, the digital system unit 202 controls film working state of the electronically controlled liquid crystal film in the transparent state. At the same time, the logic control unit 203 controls the entire Mini LED light panel to be in the lighted state based on the brightness signal, so that the collimated light emitted by the entire Mini LED light can still project the entire display panel after passing through the peep-proof film and the electronically controlled liquid crystal film in the transparent state. In this way, the information content on the entire display panel at this time can only be seen by the user in the center, and the user not in the center will not be able to see any information content.

In an embodiment, after the step of receiving and detecting the screen display signal required by the liquid crystal display device 201 in S10, it further includes:

S40, in response to detecting that the peep-proof signal in the screen display signal is a non peep-proof information, controlling the second switching timing of the film working state of the electronically controlled liquid crystal film in the opaque state according to the non peep-proof information, and controlling the backlight working state of the lamp panel to be the first switching timing in the lighted state according to the brightness signal.

When the peep-proof signal is detected by the digital system unit 202 and the information obtained is the non peep-proof information, it means that the user at this time does not have the need to perform peep-proof operations on the display panel. Therefore, based on the non peep-proof information, the digital system unit 202 controls the film working state of the electronically controlled liquid crystal film to be in the opaque state. At the same time, the logic control unit 203 controls the entire Mini LED light panel to be in the extinguished state based on the brightness signal, so that the collimated light emitted by the entire Mini LED light is diverged after passing through the electronically controlled liquid crystal film in the opaque state, and the scattered light is projected on the entire display panel. In this way, the information content on the entire display panel at this time can be seen by users at any visual angle.

In this embodiment, in addition to performing the partial peep-proof operations on the information content displayed on the certain area on the display panel, the user can also perform full peep-proof operations and non peep-proof operations on the entire display panel based on actual needs, which meets the user's diversified operation requirements.

Figure 8:
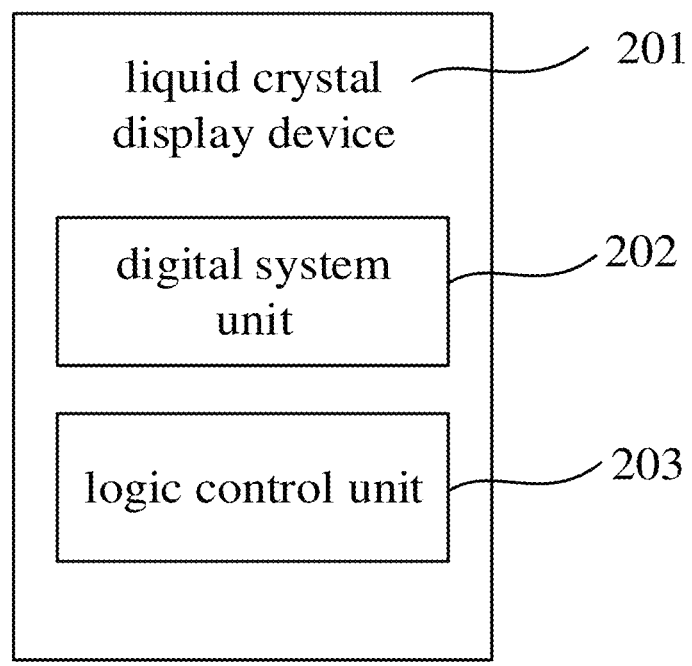
FIG. 8 is a schematic block view of a liquid crystal display device according to an embodiment of the present application.

Referring to FIG. 8, in an embodiment, the present application also provides a liquid crystal display device 201, including:

the digital system configured to receive and detect the screen display signal required by the liquid crystal display device 201, and the screen display signal includes the brightness signal and the peep-proof signal; and the logic control unit 203 configured to control the backlight operation of the lamp panel in the liquid crystal display device 201 according to the partial peep-proof information and the brightness signal in response to detecting that the peep-proof signal in the screen display signal is the partial peep-proof information, the first switching timing of the state is matched with the second switching timing of the film working state of the electronically controlled liquid crystal film, so as to realize the partial peep-proof display of the liquid crystal display device 201.

Figure 5:
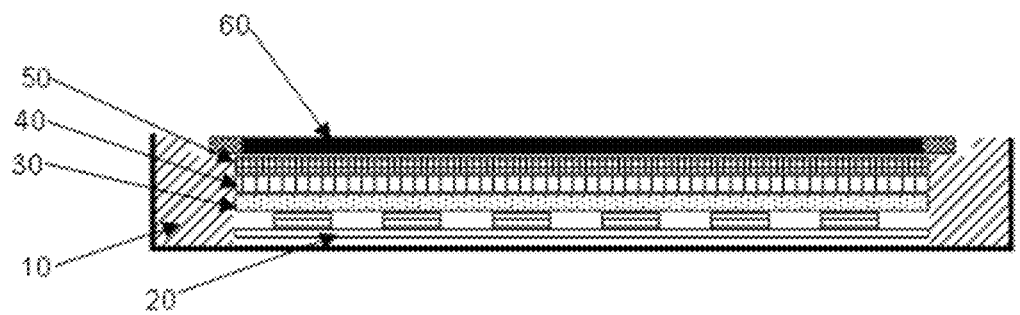
FIG. 5 is a schematic structural view of a liquid crystal display device of the present application.

Referring to FIG. 5, the liquid crystal display device 201 further includes: a lamp panel 20 and an electronically controlled liquid crystal film 50;

the lamp panel 20 includes a plurality of backlight districts arranged at intervals, and the backlight districts include a target backlight district for projecting the peep-proof area. When the liquid crystal display device 201 is in the partial peep-proof mode, the first switching timing of the target backlight district in the lighted state is synchronized with the second switching timing of the electronically controlled liquid crystal film 50 in the transparent state; the first switching timing of the target backlight district in the extinguished state is synchronized with the second switching timing of the electronically controlled liquid crystal film 50 in the opaque state. The lighted state and the extinguished state are the backlight working states of the backlight district, and the transparent state and the opaque state are the film working states of the electronically controlled liquid crystal film 50.

In an embodiment, the liquid crystal display device 201 further includes an optical adjusting control member 30, a peep-proof film 40 and a display panel 60 sequentially stacked along the light emitting direction of the lamp panel.

The electronically controlled liquid crystal film 50 is provided between the peep-proof film 40 and the display panel 60.

The lamp panel 20, the optical adjusting control member 30, the peep-proof film 40, the electronically controlled liquid crystal film 50 and the display panel 60 form a liquid crystal display assembly, and the liquid crystal display assembly is arranged in the supporting frame 10.

According to the liquid crystal display device 201 shown in FIG. 5, the ordinary lamp panel in the existing liquid crystal display device 201 is replaced by the Mini LED lamp panel with multiple backlight districts at intervals, because the Mini LED type lamp panel 20 is composed of several lamp beads. Compared with the ordinary lamp panel which can only operate with the same brightness as a whole, the Mini LED lamp panel can operate with different and partial brightness, so that the brightness projected to the electronically controlled liquid crystal film 50 can perform different light and dim effects.

Figure 6:
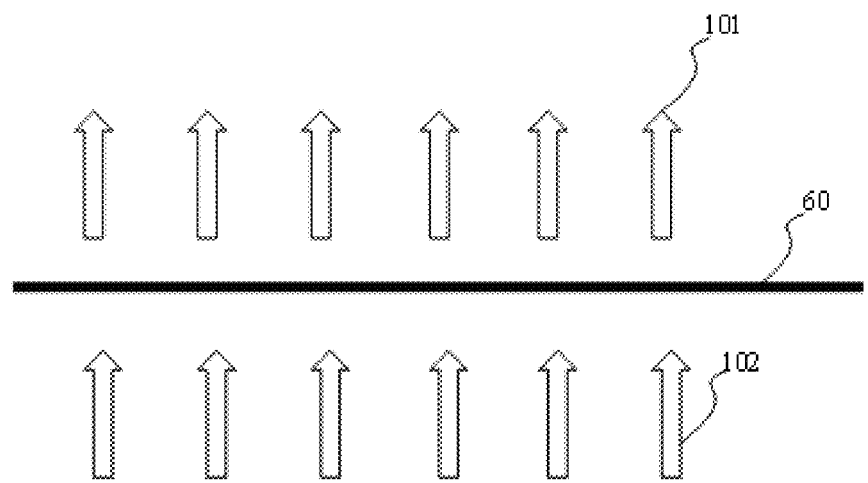
FIG. 6 is a schematic view of a collimated state of an incident light emitted by a lamp panel in the lighted state through a display panel.
Figure 7:
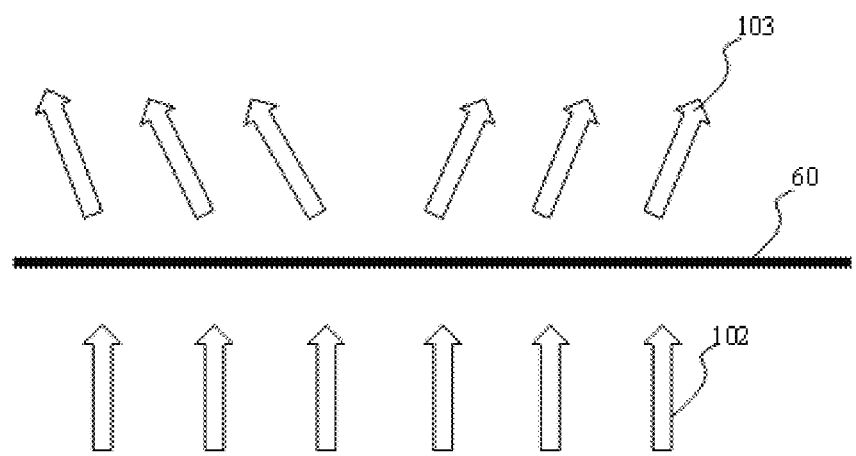
FIG. 7 is a schematic view of a scattering state of the incident light emitted by the lamp panel in the lighted state through the display panel.

The electronically controlled liquid crystal film 50 realizes the transition between the transparent state and the opaque state through the adjustment of the voltage. The light sources with different light and dim effects are projected based on the different states of the electronically controlled liquid crystal film 50, so as to realize the partial peep-proof of the liquid crystal display device 201. As shown in FIG. 6, the transparent state, which is the energized state of the electronically controlled liquid crystal film 50, can make the incident light 102, that is, the light emitted by the Mini LED lamp panel, collimate and emit 101 on the display panel 60. As shown in FIG. 7, the opaque state, which is the power-off state of the electronically controlled liquid crystal film 50, can cause the incident light 102 to scatter and emit 103 on the display panel. In order to realize the peep-proof effect when the electronically controlled liquid crystal film 50 is in the opaque state, the target backlight district at this time is switched to the extinguished state to avoid incident light scattering. The first switching timing and the second switching timing only appear when the liquid crystal display device 201 has peep-proof requirements, and the switching timing is the time point beneficial to achieve the peep-proof effect.

The target backlight district refers to the partition that needs to be adapted to the second switching timing of the film working state of the electronically controlled liquid crystal film 50 to realize the peep-proof effect. Those outside the target backlight district are other backlight districts, which do not need to have the peep-proof effect, so they do not need to be adapted to the second switching timing of the film working state of the electronically controlled liquid crystal film 50.

In addition, the display panel 60 on the liquid crystal display device 201 is used to drive the liquid crystal molecules according to the received adaptation signal to display the screen. The optical adjusting control member, which generally includes one or more combinations of a diffusion film, a prism film, a composite film, and a dual brightness enhancement film (DBEF), etc., can mix the light source projected by the Mini LED lamp panel into a uniform surface light source. The peep-proof film 40, which used to filter the non-collimation in the opposite light source, that is, the surface light source is converted into the collimated light with a small angle, and each light is emitted approximately in parallel and perpendicular to the display panel 60.

The supporting frame 10 is used to ensure the stability and normal operation of the liquid crystal display device 201, and the supporting frame 10 includes a plurality of supporting structures.

It should be noted that, as used herein, the term "comprises", "includes" or any other variation thereof is intended to cover a non-exclusive inclusion such that a process, a method, an article or a system comprising a set of elements includes not only those elements, it also includes other elements not expressly listed, or elements inherent in the process, the method, the article, or the system. Without further limitations, an element defined by the phrase "comprising a . . . " does not preclude the presence of additional identical elements in the process, the method, the article or the system comprising that element.

The serial numbers of the above embodiments of the present application are only for description, and do not represent the advantages and disadvantages of the embodiments.

Through the description of the above embodiment, those skilled in the art can clearly understand that the above-mentioned embodiment method can be realized by means of software plus a necessary general-purpose hardware platform, and of course also by hardware, but in many cases the former is a better implementation. Based on such an understanding, the technical solution of the present application can be embodied in the form of a software product in essence or the part that contributes to the prior art, and the computer software product is stored in a storage medium, such as the ROM/RAM, the magnetic disk, and the optical disk, including several instructions to enable a terminal device, which may be a mobile phone, a computer, a server, an air conditioner, or a network device, etc., to execute the methods described in various embodiments of the present application.

The above are only some embodiments of the present application, and do not limit the scope of the present application. Any equivalent structure or equivalent process transformation made by using the specification and drawings of the application, or directly or indirectly used in other related technical fields, are all included in the scope of the present application in the same way.

What is claimed is:

1. A peep-proof control method for a liquid crystal display device, comprising:
    receiving and detecting a screen display signal required by the liquid crystal display device, wherein the screen display signal comprises a brightness signal and a peep-proof signal; and in response to detecting that the peep-proof signal in the screen display signal is a partial peep-proof information, controlling a first switching timing of a backlight working state of a lamp panel in the liquid crystal display device to adapt to a second switching timing of a film working state of an electronically controlled liquid crystal film according to the brightness signal, so as to realize a partial peep-proof display of the liquid crystal display device; wherein the in response to detecting that the peep-proof signal in the screen display signal is the partial peep-proof information, controlling the first switching timing of the backlight working state of the lamp panel in the liquid crystal display device to adapt to the second switching timing of the film working state of the electronically controlled liquid crystal film according to the brightness signal comprises:

after the peep-proof signal is detected by a digital system unit and an obtained information is the partial peep-proof information, controlling, via the digital system unit, the electronically controlled liquid crystal film to switch between a transparent state and an opaque state at a frequency greater than or equal to 20 Hz.

2. The peep-proof control method for the liquid crystal display device of claim 1, wherein the transparent state is an energized state of the electronically controlled liquid crystal film, and the opaque state is a power-off state of the electronically controlled liquid crystal film.

3. The peep-proof control method for the liquid crystal display device of claim 1, wherein before the controlling the first switching timing of the backlight working state of the lamp panel in the liquid crystal display device to adapt to the second switching timing of the film working state of the electronically controlled liquid crystal film according to the brightness signal, the method further comprises:

dividing the lamp panel into a target backlight district and other backlight districts according to a peep-proof screen position signal in the partial peep-proof information, and controlling the film working state of the electronically controlled liquid crystal film according to a film working signal in the partial peep-proof information.

4. The peep-proof control method for the liquid crystal display device of claim 3, wherein the target backlight district is configured to adapt to the second switching timing of the film working state of the electronically controlled liquid crystal film for providing a peep-proof effect, and the target backlight district is dynamically changeable.

5. The peep-proof control method for the liquid crystal display device of claim 3, wherein the controlling the first switching timing of the backlight working state of the lamp panel in the liquid crystal display device to adapt to the second switching timing of the film working state of the electronically controlled liquid crystal film according to the brightness signal comprises:

in response to that the film working state of the electronically controlled liquid crystal film is the second switching timing in the transparent state, controlling the backlight working state of the target backlight district to be the first switching timing in a lighted state and controlling the backlight working state of the other backlight districts to be the first switching timing in an extinguished state according to the brightness signal.

6. The peep-proof control method for the liquid crystal display device of claim 3, wherein the controlling the first switching timing of the backlight working state of the lamp panel in the liquid crystal display device to adapt to the second switching timing of the film working state of the electronically controlled liquid crystal film according to the brightness signal comprises:

in response to that the film working state of the electronically controlled liquid crystal film is the second switching timing in the opaque state, controlling the backlight working state of the target backlight district to be the first switching timing in the extinguished state and controlling the backlight working state of the other backlight districts to be the first switching timing in the lighted state according to the brightness signal.

7. The peep-proof control method for the liquid crystal display device of claim 6, wherein the controlling the backlight working state of the target backlight district to be the first switching timing in the extinguished state and controlling the backlight working state of the other backlight districts to be the first switching timing in the lighted state according to the brightness signal comprises:

adjusting, according to the brightness signal, a light of the target backlight district and the other backlight districts through a pulse width modulation (PWM) dimming, wherein an adjustment frequency of beads in the target backlight district and the other backlight districts is an integer multiple of a frequency of the electronically controlled liquid crystal film.

8. The peep-proof control method for the liquid crystal display device of claim 1, wherein after receiving and detecting the screen display signal required by the liquid crystal display device, the method further comprises:

in response to detecting that the peep-proof signal in the screen display signal is a full peep-proof information, controlling the second switching timing of the film working state of the electronically controlled liquid crystal film to be in the transparent state according to the full peep-proof information, and controlling the backlight working state of the lamp panel to be the first switching timing in the lighted state according to the brightness signal.

9. The peep-proof control method for the liquid crystal display device of claim 1, wherein after the receiving and detecting the screen display signal required by the liquid crystal display device, the method further comprises:

in response to detecting that the peep-proof signal in the screen display signal is a non peep-proof information, controlling the second switching timing of the film working state of the electronically controlled liquid crystal film in the opaque state according to the non peep-proof information, and controlling the backlight working state of the lamp panel to be the first switching timing in the lighted state according to the brightness signal.

10. The peep-proof control method for the liquid crystal display device of claim 1, wherein the screen display signal further comprises an adaptation signal; and the method further comprises:

driving liquid crystal molecules in the display panel in the liquid crystal display device through the adaptation signal, and performing a corresponding picture on the display panel according to the brightness signal and the peep-proof signal.

11. A liquid crystal display device, applied to the peep-proof control method for the liquid crystal display device of claim 1, comprising:

a digital system unit configured to receive and detect a screen display signal required by the liquid crystal display device, wherein the screen display signal comprises a brightness signal and a peep-proof signal;

a logic control unit configured to, in response to detecting that the peep-proof signal in the screen display signal is a partial peep-proof information, control a first switching timing of a backlight working state of a lamp panel in the liquid crystal display device to adapt to a second switching timing of a film working state of an electronically controlled liquid crystal film according to the partial peep-proof information and the brightness signal, to realize a partial peep-proof display of the liquid crystal display device; and the lamp panel and the electronically controlled liquid crystal film;

wherein the lamp panel comprises a plurality of backlight districts arranged at intervals, the backlight districts comprise a target backlight district for projecting peep-proof areas, in response to that the liquid crystal display device is in a partial peep-proof mode, the first switching timing in a lighted state of the target backlight district is synchronized with the second switching timing in a transparent state of the electronically controlled liquid crystal film; the first switching timing in an extinguished state of the target backlight district is synchronized with the second switching timing in an opaque state of the electronically controlled liquid crystal film, wherein the lighted state and the extinguished state are backlight working states of the backlight districts, and the transparent state and the opaque state are film working states of the electronically controlled liquid crystal film.

12. The liquid crystal display device of claim 11, further comprising an optical adjusting control member, a peep-proof film and a display panel sequentially stacked along a light emitting direction of the lamp panel; wherein the electronically controlled liquid crystal film is provided between the peep-proof film and the display panel; and the lamp panel, the optical adjusting control member, the peep-proof film, the electronically controlled liquid crystal film and the display panel form a liquid crystal display assembly, and the liquid crystal display assembly is arranged in a supporting frame.

13. The liquid crystal display device of claim 12, wherein the display panel is configured to drive liquid crystal molecules according to the received adaptation signal to display the screen;

the optical adjusting control member comprises a diffusion sheet and a prism sheet, and the optical adjusting control member is configured to mix a light source projected by the lamp panel into a uniform surface light source;

the peep-proof film is configured to filter a non-collimated light in the surface light source; and the supporting frame is configured to ensure a stability and a normal operation of the liquid crystal display device, and the supporting frame comprises a plurality of supporting members.

* * * * *